United States Patent
Eidam et al.

(10) Patent No.: US 10,318,860 B1
(45) Date of Patent: *Jun. 11, 2019

(54) WEARABLE COMPUTING DEVICE-POWERED CHIP-ENABLED CARD

(71) Applicant: Wells Fargo Bank, N.A., San Francisco, CA (US)

(72) Inventors: Kourtney Eidam, Marietta, GA (US); Michael Thomas Duke, Monroe, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,032

(22) Filed: Oct. 3, 2018

Related U.S. Application Data

(63) Continuation of application No. 15/394,611, filed on Dec. 29, 2016, now Pat. No. 10,133,979.

(51) Int. Cl.
  *G06K 19/07* (2006.01)
  *G06K 19/14* (2006.01)
  *G06K 19/077* (2006.01)

(52) U.S. Cl.
  CPC ....... *G06K 19/145* (2013.01); *G06K 19/0723* (2013.01); *G06K 19/07701* (2013.01); *G06K 19/07762* (2013.01)

(58) Field of Classification Search
  None
  See application file for complete search history.

(56) References Cited

U.S. PATENT DOCUMENTS

| 7,258,272 B2 | 8/2007 | Yoshizane et al. |
| 7,681,232 B2 | 3/2010 | Nordentoft et al. |

(Continued)

FOREIGN PATENT DOCUMENTS

| EP | 1326196 A1 | 9/2003 |
| EP | 1775674 A1 | 4/2007 |

OTHER PUBLICATIONS

Ahlerg., "Smart Skin: Electronics that stick and stretch like a temporary tattoo," Illinois News Bureau, accessed from https://news_illinois.edu/blog/view/6367/205260, Aug. 11, 2011, 5 pp.

(Continued)

*Primary Examiner* — Kristy A Haupt
(74) *Attorney, Agent, or Firm* — Shumaker & Sieffert, P.A.

(57) ABSTRACT

Techniques are described for powering a chip-enabled card using a wearable computing device. The chip-enabled card is paired with the wearable computing device and a specific signal is generated for the chip-enabled card. When the chip-enabled card is proximate to the wearable computing device, the wearable computing device transmits the specific signal associated with the chip-enabled card through a conducting element in contact with the user's body, through the user's body, and to a touch pad of the chip-enabled card that is also in contact with a portion of the user's body. According to the disclosed techniques, the chip of the chip-enabled card verifies that the received specific signal is associated with the chip-enabled card, and uses the verified specific signal to power subsequent transactions performed by the chip-enabled card. In this way, the chip-enabled card only emits a signal to perform transactions when the user is holding the card.

40 Claims, 7 Drawing Sheets

(56) References Cited

U.S. PATENT DOCUMENTS

| | | | |
|---|---|---|---|
| 8,276,816 | B2 | 10/2012 | Gardner |
| 8,417,584 | B2 | 4/2013 | Ross |
| 8,715,178 | B2 | 5/2014 | Price et al. |
| 8,715,179 | B2 | 5/2014 | Price et al. |
| 9,124,570 | B1 | 9/2015 | Asher et al. |
| 9,721,409 | B2 | 8/2017 | Sezan et al. |
| 9,743,443 | B2 | 8/2017 | Panther |
| 9,892,576 | B2 | 2/2018 | Kursun et al. |
| 10,133,979 | B1 * | 11/2018 | Eidam et al. .......... G06K 19/14 235/492 |
| 2004/0019570 | A1 | 1/2004 | Bolle et al. |
| 2007/0252001 | A1 | 11/2007 | Kail et al. |
| 2009/0328163 | A1 | 12/2009 | Preece |
| 2011/0201960 | A1 | 8/2011 | Price et al. |
| 2014/0188770 | A1 | 7/2014 | Agrafioti et al. |
| 2015/0235055 | A1 | 8/2015 | An et al. |
| 2015/0288681 | A1 | 10/2015 | Park et al. |
| 2016/0112415 | A1 | 4/2016 | Park et al. |
| 2016/0378964 | A1 | 12/2016 | Singh et al. |
| 2017/0083909 | A1 | 3/2017 | Mork et al. |
| 2018/0069847 | A1 | 3/2018 | Potnuru et al. |
| 2018/0150126 | A1 | 5/2018 | Xu et al. |

OTHER PUBLICATIONS

Boden., "Developers unveil electronic tattoos for payment and healthcare," NFC World Knowledge Centre accesed from https://www.nfcworld.com/2015/12/01/340243/developers-unveil-electronic-tattoos-payments-healthcare/, Dec. 1, 2015, 3 pp.

Reutzel., "PayThink The Dawn of the Payment Tattoo," PaymentsSource, accessed from https://www.paymentssource.com/opinion/the-dawn-of-the-payment-tattoo, Jul. 29, 2014, 5 pp.

U.S. Appl. No. 15/394,581, by Kourtney Eidam, filed Dec. 29, 2016.

Suzuki et al., "Ishin-Den-Shin: Transmitting Sound Through Touch," accessed from https://www.disneyresearch.com/project/ishindenshin/ on Dec. 2, 2016, 5 pp.

U.S. Appl. No. 15/394,597, by Kourtney Eidam, filed Dec. 29, 2016.

McClay et al., "A Real-Time Magnetoencephalography Brain-Computer Interface Using Interactive 3D Visualization and the Hadoop Ecosystem," Brain Science., Sep. 30, 2015, 5, 419-440. 22 pp.

United States, Government Accountability Office, Facial Recognition Technology: Commercial Users, Privacy Issues, and Applicable Federal Law, Jul. 2015, 54 pp.

McClay et al., "Amplitude-modulated phase-only filtering and high-dimensional warping for registration on MRI brain images", Proceeding of SPIE Digital Library, Sep. 8, 2006, 15 pp.

Prosecution History from U.S. Appl. No. 15/394,611, dated Jan. 25, 2018 through Jul. 20, 2018, 33 pp.

\* cited by examiner

US 10,318,860 B1

WEARABLE COMPUTING DEVICE-POWERED CHIP-ENABLED CARD

This application is a continuation of U.S. patent application Ser. No. 15/394,611, filed Dec. 29, 2016, the contents of which are hereby incorporated by reference in their entirety.

TECHNICAL FIELD

The disclosure relates to wearable technology and chip-enabled card technology.

BACKGROUND

Credit cards have long provided card holders with a convenient payment option at a majority of merchants. Credit cards include unique information that links the card to a card holder's account with a financial institution (e.g., a bank or a non-bank card issuer). For example, in the case of a traditional credit card, the account may comprise an amount of credit available to the card holder, or in the case of a debit card, the account may comprise a checking or savings account that belongs to the card holder. Credit cards typically include the card holder's name, the account number, an expiration date, and a card security code (CSC) (alternatively referred to as a card verification value (CVV) or card verification code (CVC)) printed or embossed on the physical card.

Credit cards may also include a magnetic stripe or an integrated circuit (IC) chip that is attached to the physical card and encoded with the unique information. In some examples, magnetic stripe or IC chip cards may be encoded for use as personal identification cards, secure access badges, insurance cards, gift cards, or the like. In the case of a chip-enabled card, the IC chip embedded on the card may be configured to store additional information and/or perform processing tasks that exceed the capabilities of a magnetic stripe. For example, a single chip-enabled card may be programmed with multiple financial account credentials, insurance information, and personal identification information. In other examples, chip-enabled cards may be configured to implement cryptographic algorithms to enhance security for card transactions.

In addition to, or instead of, physical cards, card holders may use virtual wallet applications executed on computing devices to perform online transactions. Similar to the physical cards discussed above, the virtual wallet may include digitized versions of credit cards, debit cards, personal identification cards, secure access badge, insurance cards, gift, cards, or the like. A computing device configured to execute a virtual wallet application may be any of a wide range of devices, including laptop or desktop computers, tablet computers, so-called "smart" phones, "smart" pads, "smart" watches, or other personal digital appliances equipped for wired or wireless communication.

SUMMARY

In general, this disclosure describes techniques for powering a chip-enabled card using a wearable computing device in contact with a user's body. During initial activation, the chip-enabled card is paired with the wearable computing device and a specific signal is generated for the chip-enabled card. After the initial activation, when the chip-enabled card is proximate to the paired wearable computing device, the wearable computing device transmits the specific signal associated with the chip-enabled card through a conducting element of the wearable computing device that is in contact with the user's body. The specific signal travels through the user's body and to an electrically conducting touch pad of the chip-enabled card that is also in contact with a portion of the user's body, e.g., the user's thumb. According to the disclosed techniques, the integrated circuit (IC) chip of the chip-enabled card verifies that the received signal is the specific signal associated with the chip-enabled card, and uses the verified specific signal to power transactions performed by the chip-enabled card. In this way, the chip-enabled card only emits a signal including the user's information while the user is holding the card or for a time period after the user has held the card, e.g., when the user is attempting to perform a transaction.

In one example, this disclosure is directed to a wearable computing device comprising a transmitter connected to a conducting element of the wearable computing device in contact with a user's body, and one or more processors connected to the transmitter. The one or more processors are configured to detect that a chip-enabled card is proximate to the wearable computing device, wherein the chip-enabled card is paired to the wearable computing device; based on the chip-enabled card being proximate to the wearable computing device, instruct the transmitter to transmit a specific signal associated with the chip-enabled card through the conducting element to the user's body; and receive a notification indicating whether the chip-enabled card is powered by the specific signal.

In another example, this disclosure is directed to a method comprising detecting, by a wearable computing device including a conducting element in contact with a user's body, that a chip-enabled card is proximate to the wearable computing device, wherein the chip-enabled card is paired to the wearable computing device; based on the chip-enabled card being proximate to the wearable computing device, transmitting, by the wearable computing device, a specific signal associated with the chip-enabled card through the conducting element to the user's body; and receiving, by the wearable computing device, a notification indicating whether the chip-enabled card is powered by the specific signal.

In a further example, this disclosure is directed to a chip-enabled card comprising a touch pad including a receiver configured to receive a signal from a wearable computing device through a portion of a user's body in contact with the touch pad, wherein the chip-enabled card is paired to the wearable computing device, and an integrated circuit chip connected to the receiver. The integrated circuit is configured to determine whether the signal is the specific signal associated with the chip-enabled card; based on the received signal being the specific signal associated with the chip-enabled card, power the integrated circuit chip using the specific signal; and based on the integrated circuit chip being powered, emit a signal to perform a transaction with an external device.

In an additional example, this disclosure is directed to a method comprising receiving, by a chip-enabled card including a touch pad, a signal from a wearable computing device through a portion of a user's body in contact with the touch pad, wherein the chip-enabled card is paired to the wearable computing device; determining, by the chip-enabled card, whether the signal is the specific signal associated with the chip-enabled card; based on the received signal being the specific signal associated with the chip-enabled card, powering an integrated circuit chip of the chip-enabled card using the specific signal; and based on the integrated circuit chip being powered, emitting a signal to perform a transaction with an external device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
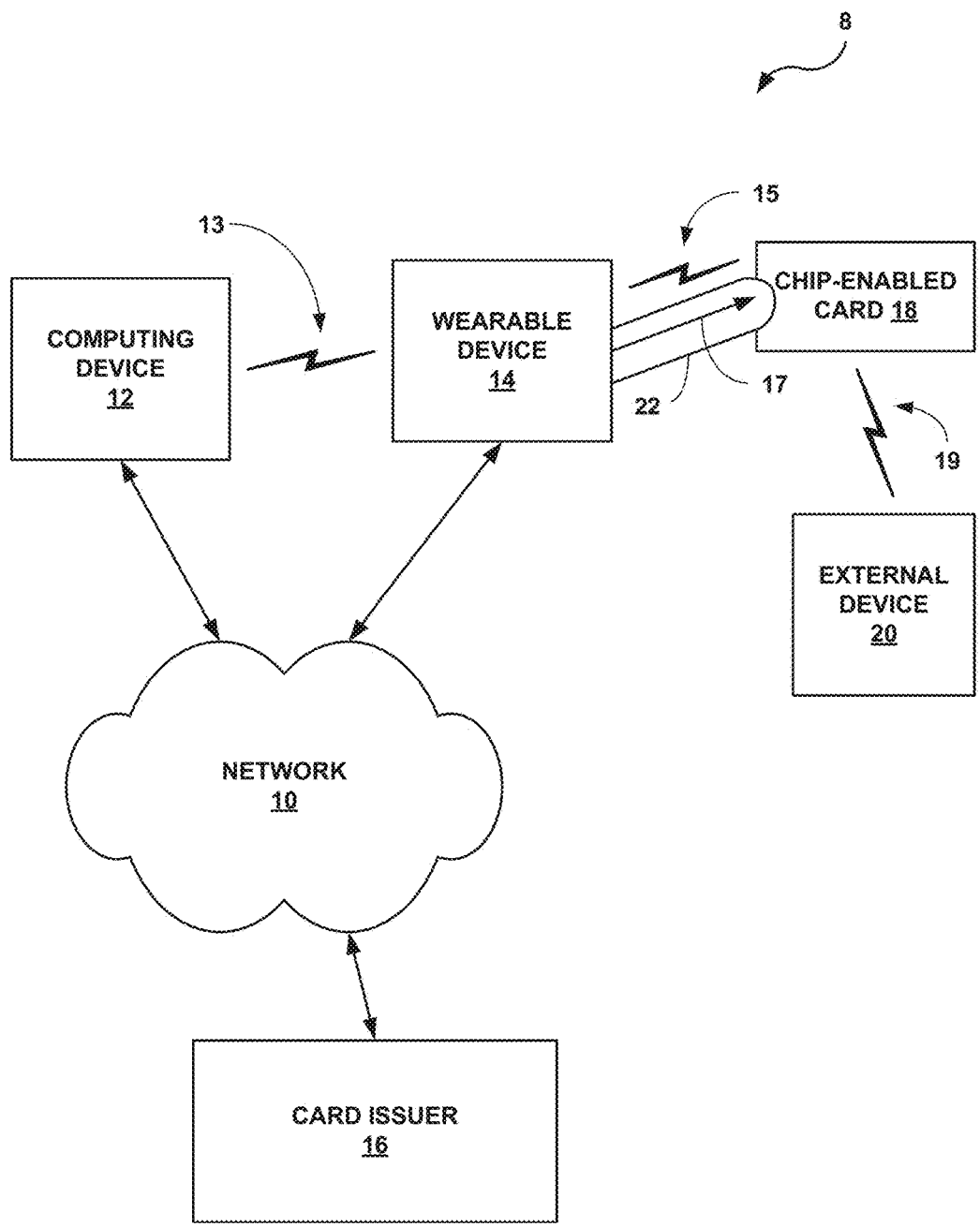
FIG. 1 is a block diagram illustrating an example network system including a wearable computing device configured to provide power to a chip-enabled card to perform transactions, in accordance with the techniques of this disclosure.

FIG. 1 is a block diagram illustrating an example network system 8 including a wearable computing device 14 configured to provide power to a chip-enabled card 18 to perform transactions, in accordance with the techniques of this disclosure. As illustrated in FIG. 1, network system 8 includes a computing device 12 and a wearable device 14 that are in communication with a card issuer 16 via a network 10. In addition, network system 8 includes chip-enabled card 18 that is in communication with wearable device 14 and an external device 20.

Chip-enabled cards include an integrated circuit (IC) chip attached to a physical card and encoded with information. In some examples, chip-enabled cards may be configured to operate as credit cards, debit cards, gift cards, or other financial instruments in which the embedded IC chip is encoded with a user's financial information that links the card to the user's account with a financial institution. In other examples, chip-enabled cards may be configured to operate as personal identification cards, secure access badges, insurance cards, or the like, in which the embedded IC chip is encoded with a user's identification information. In addition, the IC chip embedded on the chip-enabled card may include a rewritable memory and/or a processing unit enabling the card to be reprogrammed for different uses. For example, a single chip-enabled card may be programmed with multiple financial account credentials, insurance information, and personal identification information. In other examples, chip-enabled cards may be configured to implement cryptographic algorithms to enhance security for card transactions.

For transactions performed by a chip-enabled credit card at a merchant, for example, the user's financial information may be retrieved when the IC chip is inserted or positioned proximate to a point-of-sale (POS) device for the merchant. Chip-enabled cards, typically, do not include their own batteries or other power sources. In some examples, the IC chip embedded on the chip-enabled card is powered by an electromagnetic impulse received from the POS device. Once powered, the IC chip may give off a continuous signal that includes the user's financial information to perform a transaction with the POS device for merchant. The chip-enabled card and the POS device may exchange power and data to complete the transaction through either direct contact or some form of short-range wireless communication, e.g., near-field communication (NFC), radio-frequency identification (RFID), Bluetooth®, or the like. Non-financial chip-enabled cards may perform transactions using the user's identification information in a similar manner when powered by an electromagnetic impulse received from an external computing device.

In the case of either a financial or non-financial chip-enabled card, the signal emitted by the card typically includes private information of the user, which could be used to perform bank fraud or identity fraud if the private information is discovered by a malicious or fraudulent actor. In some examples, the chip-enabled card may be powered whenever the card is proximate to any POS device or other external device providing an electromagnetic impulse. The chip-enabled card, therefore, may continuously emit the signal that includes the user's information when proximate to a source of an electromagnetic impulse even when the user is not attempting to perform a transaction using the card. In this way, the signal continuously emitted by the chip-enabled cards may be susceptible to skimming by a fraudulent actor.

The techniques described in this disclosure enable wearable device 14, which is in contact with a user's body 22, to transmit a specific signal associated with chip-enabled card 18 through the user's body 22 to provide power to chip-enabled card 18 when held by the user to perform a transaction. According to the disclosed techniques, in some examples, chip-enabled card 18 may only emit a signal including the user's information while receiving the specific signal (i.e., while the user is holding the card) and/or for a variable or set time period after receiving the specific signal. The disclosed techniques, therefore, may reduce the frequency and amount of time that chip-enabled card 18 is emitting the signal and, hence, may make the signal less susceptible to skimming by a fraudulent actor. In addition, because chip-enabled card 18 may only be powered by specific signals received from paired wearable computing devices, the disclosed techniques may make chip-enabled card 18 less likely to be powered by fraudulent external devices for the purpose of skimming the subsequently emitted signal.

In the example illustrated in FIG. 1, card issuer 16 may be a portion of a financial institution, e.g., a bank or a non-bank entity, capable of providing payment services in the form of credit cards. In some examples, card issuer 16 may comprise one or more computing devices, such as such as desktop computers, laptops, workstations, wireless devices, network-ready appliances, file servers, print servers, or other devices, included in a centralized or distributed system of computing devices for the financial institution. Credit cards issued by card issuer 16 may be linked to a user's account with card issuer 16. In the case of a traditional credit card, the account may comprise an amount of credit available to the user. In the case of a debit card, the account may comprise a checking or savings account that belongs to the user. For ease of explanation, this disclosure uses the term "credit card" to refer to both a traditional credit card and a debit card. In other examples, card issuer 16 may represent any card issuing authority. For example, card issuer 16 may be a portion of a government entity responsible for issuing identification cards, a portion of a security division within a corporation responsible for issuing security access badges to employees and/or visitors, or a portion of an insurance company responsible for issuing insurance cards to policy holders.

In the illustrated example of FIG. 1, card issuer 16 is the issuer of chip-enabled card 18. Card issuer 16 may issue chip-enabled card 18 for a given user and associate chip-enabled card 18 with one or more accounts held by the user. In some examples, when chip-enabled card 18 is used to perform transactions with external device 20, card issuer 16 may communicate with external device 20 (in a manner not specifically shown in FIG. 1) to provide authorization of the transactions.

As shown in FIG. 1, card issuer 16 is in communication with computing device 12 and wearable device 14 through network 10. In some examples, network 10 may comprise a private network associated with the financial institution or other entity of which card issuer 16 is a part. In other examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

Computing device 12 may comprise any of a wide range of user devices, including laptop or desktop computers, tablet computers, so-called "smart" phones, "smart" pads, or other personal digital appliances equipped for wired or wireless communication. Computing device 12 may include at least one user interface device (not shown) that enables a user to interact with computing device 12. In some examples, the user interface device of computing device 12 may be configured to receive tactile, audio, or visual input. In addition to receiving input from the user, the user interface device of computing device 12 may be configured to output content such as a graphical user interface (GUI) for display, e.g., at a display device associated with computing device 12. An example of computing device 12 is described in more detail below with respect to FIG. 2.

In the example illustrated in FIG. 1, computing device 12 communicates with card issuer 16 via network 10, and communicates with wearable device 14 via a wireless signal 13. Wireless signal 13 may conform to a short-range wireless communication protocol, such as NFC or Bluetooth, that enables communication between two devices when the two devices within a certain distance from each other. As one example, NFC may enable communication between two devices that are within 20 centimeters of each other. In another example, Bluetooth may enable communication between two devices that are within 100 meters of each other.

Wearable device 14 may comprise any of a wide range of computing devices that are configured to be attached to some portion of a user's body such that a conducting element (not shown in FIG. 1) is in contact with the user's body. In some examples, wearable device 14 may comprise a computing device in the form of a watch, a bracelet, an arm band, an ankle band, an ear cuff, or another form factor capable of being worn by encircling some portion of the user's body. In other examples, wearable device 14 may comprise electronic skin technology, also referred to as "skin tech" or "digital tattoo," in the form of a thin, flexible film that includes embedded electronics capable of being worn by adhering directly to a user's skin, e.g., as a sticker, patch, or temporary tattoo. In some cases, electronics of wearable device 14 may include simple circuitry capable of responding to signals from the user's body, and/or responding to signals from an external computing device, e.g., computing device 12. In other cases, the electronics of wearable device 14 may include one or more processors, rewritable memory, and power sources. An example of wearable device 14 is described in more detail below with respect to FIG. 3.

In one example of network system 8 in FIG. 1, wearable device 14 may be configured to operate as an accessory that is paired or linked to computing device 12. In this example, wearable device 14 may be considered a "dumb" device that does not have full communication and/or processing capabilities. For example, wearable device 14 may be used to monitor a user's vital signs or a user's behavioral biometrics, but send the monitored information to computing device 12 for further analysis or output to the user. Some examples of a user's vital signs include heart rate, breathing rate, blood pressure, or body temperature. Some examples of a user's behavior biometrics include gait, voice, or speed of typing, talking or texting. In accordance with the disclosed techniques, in the case of a "dumb" wearable device, computing device 12 may be configured to manage both wearable device 14 and chip-enabled card 18. For example, computing device 12 may be configured to communicate with card issuer 16 in order to activate chip-enabled card 18 and pair chip-enabled card 18 to wearable device 14.

In another example of network system 8 of FIG. 1, wearable device 14 may be configured as a "smart" device that is capable of accessing network 10, e.g., the Internet or another communication network, and executing applications or performing other processing tasks. In this example, wearable device 14 may monitor a user's vital signs or a user's behavioral biometrics, but may also be configured to analyze the collected information and, in some cases, output the information to the user. In accordance with the disclosed techniques, in the case of a "smart" wearable device, wearable device 14 may be configured to communicate directly with card issuer 16 in order to activate chip-enabled card 18 and pair chip-enabled card 18 to wearable device 14. In this case, computing device 12 may not be necessary for the performance of the disclosed techniques.

Chip-enabled card 18 includes an IC chip attached to a physical card and encoded with a user's information. As discussed above, chip-enabled card 18 may be configured to operate as a credit card, debit card, gift card, or other financial instrument in which the embedded IC chip is encoded with the user's financial information. Chip-enabled card 18 may additionally or alternatively be configured to operate as a personal identification card, secure access badge, insurance card, or the like in which the embedded IC chip is encoded with the user's identification information. In accordance with the disclosed techniques, chip-enabled card 18 also includes an electrically conducting touch pad that is physically connected to the IC chip. The touch pad is designed to be in contact with a portion of the user's body 22, e.g., a user's thumb, when chip-enabled card 18 is held to perform a transaction. An example of chip-enabled card 18 is described in more detail below with respect to FIG. 4, and an example of the IC chip on chip-enabled card 18 is described in more detail below with respect to FIG. 5.

In the example illustrated in FIG. 1, wearable device 14 may communicate with chip-enabled card 18 via a wireless signal 15 and an electromagnetic pulse 17 that travels through a user's body 22. Wireless signal 15 may conform to a short-range wireless communication protocol, such as NFC, RFID, or Bluetooth. During initial activation of chip-enabled card 18, either computing device 12 or wearable device 14 may register wearable device 14 with card issuer 16, and pair the registered wearable device 14 to chip-enabled card 18. This pairing may be performed through an exchange of information between wearable device 14 and chip-enabled card 18 via wireless signal 15. In addition, during initial activation of chip-enabled card 18, card issuer 16 associates a specific signal with chip-enabled card 18, and sends the specific signal to chip-enabled card 18 and at least one of computing device 12 and wearable device 14. The specific signal is a signal that may be unique to chip-enabled card 18 or unique to the pairing between chip-enabled card 18 and wearable device 14. The specific signal may be distinguishable from other signals that may be received by chip-enabled card 18 and may include a code or other identifier.

After the initial activation, when chip-enabled card 18 is proximate to the paired wearable device 14, wearable device 14 may activate a transmitter connected to its conducting element, and chip-enabled card 18 may activate its electrically conducting touch pad. Wearable device 14 then transmits the specific signal associated with chip-enabled card 18 through the conducting element of wearable device 14 and to the user's body 22 as electromagnetic pulse 17. The specific signal travels through the user's body 22 as electromagnetic pulse 17 and to the electrically conducting touch pad of chip-enabled card 18. In one example where wearable device 14 comprises a digital tattoo affixed to a user's wrist, electromagnetic pulse 17 travels from the digital tattoo through the user's wrist and thumb 22, and to the touch pad of chip-enabled card 18 to which the user's thumb is applied.

According to the disclosed techniques, the IC chip of chip-enabled card 18 verifies that the received signal is the specific signal associated with chip-enabled card 18, and uses the verified specific signal to power transactions performed by chip-enabled card 18. In some examples, wireless signal 15 and/or the unverified signal received from wearable device 14 may provide power for limited operations of chip-enabled card 18, e.g., pairing and signal verification operations, but only the verified specific signal may be used to power transactions with external device 20.

In some cases, wearable device 14 may receive a notification from chip-enabled card 18 indicating whether the specific signal has been verified to power chip-enabled card 18. In some examples, the specific signal may be unique to chip-enabled card 18 such that chip-enabled card 18 is only powered upon receipt of the specific signal, but the specific signal may be received from any of a plurality of paired wearable computing devices. In other examples, the specific signal may be unique to a pairing between chip-enabled card 18 and wearable device 14 such that chip-enabled card 18 is powered by the specific signal when received from wearable computing device 14, but may be powered by other signals when received from other paired wearable computing devices. In still other examples, the specific signal may be unique to a user account such that a plurality chip-enabled cards issued for the same user account may be powered by the same specific signal.

In the example illustrated in FIG. 1, when powered by wearable device 14, chip-enabled card 18 emits wireless signal 19 including the user's financial and/or identification information to perform transactions with external device 20. Wireless signal 19 may conform to a short-range wireless communication protocol, such as NFC, RFID, or Bluetooth. In one scenario, chip-enabled card 18 may emit wireless signal 19 while the user is holding card 18 and the specific signal is being received by card 18. In another scenario, chip-enabled card 18 may, alternatively or in addition, emit wireless signal 19 for a time period after the specific signal is received by card 18 and while the user is no longer holding card 18. In some examples, external device 20 may comprise a POS device at a merchant from which the user is purchasing a good or service. In other examples, external device 20 may comprise another computing device to which the user is transferring funds, providing identification information, providing insurance information, requesting secure access, or the like.

Upon receipt of wireless signal 19 from chip-enabled card 18, external device 20 may communicate with card issuer 16 to request authorization of the attempted transactions. In some cases, wearable device 14 may receive a notification directly from card issuer 16 via network 10 indicating whether the transaction performed by the powered chip-enabled card 18 is authenticated. In other cases, wearable device 14 may receive the transaction notification from computing device 12, which in turn receives the notification from card issuer 16 via network 10.

The architecture of network system 8 illustrated in FIG. 1 is shown for exemplary purposes only and should not be limited to this architecture. Network system 8 illustrated in FIG. 1 shows a single chip-enabled card 18 paired to a single wearable device 14. In other examples, network system 8 may include multiple different chip-enabled cards each issued by the same or different card issuers and each paired to single wearable device 14 or to different wearable devices. In other examples, network system 8 may include single chip-enabled card 18 paired to multiple different wearable devices that may be "smart" or "dumb" and paired to the same or different computing devices.

Figure 2:
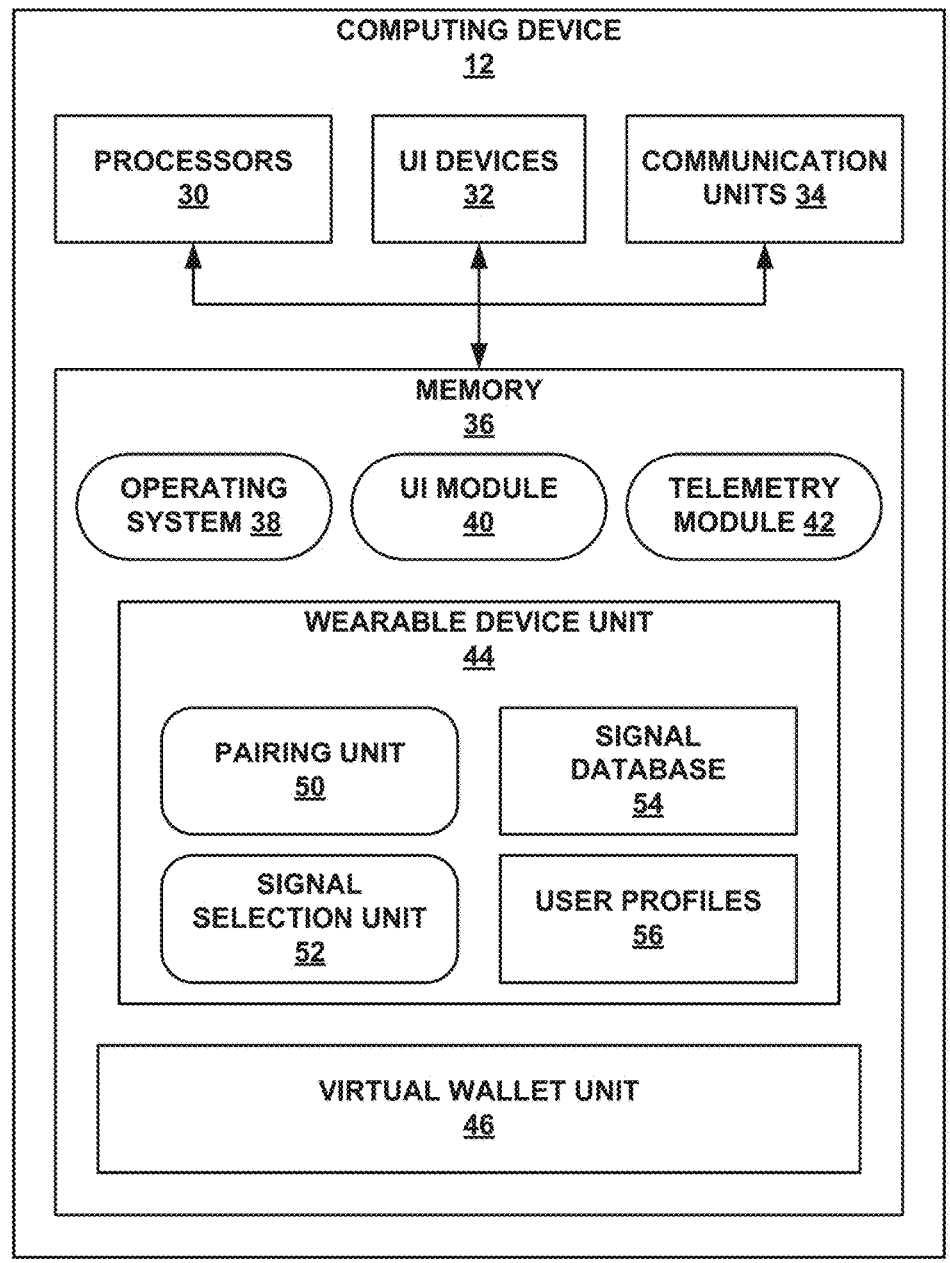
FIG. 2 is a block diagram illustrating an example computing device configured to control a wearable device used to power a chip-enabled card, in accordance with the techniques of this disclosure.

FIG. 2 is a block diagram illustrating an example of computing device 12 configured to control wearable device 14 used to power chip-enabled card 18, in accordance with the techniques of this disclosure. The architecture of computing device 12 illustrated in FIG. 2 is shown for exemplary purposes only and computing device 12 should not be limited to this architecture. In other examples, computing device 12 may be configured in a variety of ways.

As shown in the example of FIG. 2, computing device 12 includes one or more processors 30, one or more user interface (UI) devices 32, one or more communication units 34, and one or more memory units 36. Memory 36 of computing device 12 includes operating system 38, UI module 40, telemetry module 42, wearable device unit 44, and virtual wallet unit 46, which are executable by processors 30. Each of the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing device 12. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 12 during operation. Memory 36 may include a computer-readable storage medium or computer-readable storage device. In some examples, memory 36 includes one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 12 (e.g., wearable device unit 44 or virtual wallet unit 46) to temporarily store information during program execution.

Computing device 12 may utilize communication units 34 to communicate with external devices via one or more networks, e.g., network 10 from FIG. 1. Communication units 34 may be network interfaces, such as Ethernet interfaces, optical transceivers, radio frequency (RF) transceivers, or any other type of devices that can send and receive information. Other examples of such network interfaces may include Wi-Fi, NFC, or Bluetooth radios. In some examples, computing device 12 utilizes communication units 34 to wirelessly communicate with an external device such as card issuer 16 or wearable device 14. Communication units 34 may be controlled by telemetry module 42.

UI devices 32 may be configured to operate as both input devices and output devices. For example, UI devices 32 may be configured to receive tactile, audio, or visual input from a user of computing device 12. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 12. For example, operating system 38, in one example, facilitates the communication of UI module 40, telemetry module 42, wearable device unit 44, and virtual wallet unit 46 with processors 30, UI devices 32, communication units 34, and memory 36. UI module 40, telemetry module 42, wearable device unit 44, and virtual wallet unit 46 may each include program instructions and/or data stored in memory 36 that are executable by processors 30. As one example, wearable device unit 44 may include instructions that cause computing device 12 to perform one or more of the techniques described in this disclosure.

Computing device 12 may include additional components that, for clarity, are not shown in FIG. 2. For example, computing device 12 may include a battery to provide power to the components of computing device 12. Similarly, the components of computing device 12 shown in FIG. 2 may not be necessary in every example of computing device 12.

In the example illustrated in FIG. 2, wearable device unit 44 includes a pairing unit 50, a signal selection unit 52, a signal database 54, and user profiles 56. Wearable device unit 44 of computing device 12 is configured to manage pairings or links to one or more wearable devices, e.g., wearable device 14 from FIG. 1, that may operate as accessories of wearable device 12. In the case where wearable device 14 comprises a "dumb" wearable device that does not have full communication and/or processing capabilities, wearable device unit 44 may be configured to also manage operation of wearable device 14. In one example, computing device 12 may be a mobile phone and wearable device 14 may be in the form of an electronic bracelet or an electronic tattoo configured to monitor a user's vital signs and/or behavioral biometrics. In this example, wearable device unit 44 may receive the monitored information from wearable device 14, and store the monitored information of the user in user profiles 56. Wearable device unit 44 may also perform some analysis based on the monitored information, and output the results to the user via UI devices 32.

Pairing unit 50 of wearable device unit 44 may be configured to establish a pairing between computing device 12 and wearable device 14 by initiating communication with wearable device 14 via communication units 34. For example, pairing unit 50 may communicate with wearable device 14 using a short-range wireless communication protocol when wearable device 14 is within a certain distance, e.g., less than 100 m in the case of Bluetooth. Pairing unit 50 may exchange some information with wearable device 14 to establish the pairing, such as identification information and/or communication capabilities. In addition, pairing unit 50 may periodically send "keepalive" messages to wearable device 14 to maintain the pairing. Based on this pairing, computing device 12 recognizes and communicates with wearable device 14 whenever wearable device 14 is within range for the short-range wireless communication protocol.

According to the techniques of this disclosure, in addition to management of wearable devices, wearable device unit 44 may also manage activation of physical chip-enabled cards issued to the user of computing device 12, e.g., chip-enabled card 18 from FIG. 1. To perform the initial activation of chip-enabled card 18, computing device 12 accesses card issuer 16 via a browser or other application executed by processors 30. Computing device 12 may provide login information, e.g., user ID and password or access code input by the user via UI devices 32, to card issuer 16 in order to authenticate the user of computing device 12.

Pairing unit 50 of wearable device unit 44 may register any wearable devices paired to computing device 12 with card issuer 16. For example, pairing unit 50 may register wearable device 14 with card issuer 16 by providing a device ID or other identifying information for wearable device 14 to card issuer 16. Pairing unit 50 may also instruct registered wearable device 14 to establish a pairing with chip-enabled card 18. In addition, pairing unit 50 may inform card issuer 16 of the pairing between registered wearable device 14 and chip-enabled card 18.

As part of the initial activation of chip-enabled card 18, signal selection unit 52 of wearable device unit 44 may select an audio signal to be associated with chip-enabled card 18. In some examples, the selected audio signal may be a song or other audio recording that is uploaded to card issuer 16 from computing device 12 via communication units 34. In other examples, the selected audio signal may be selected by the user of computing device 12 via UI devices 32 from a plurality of audio signals stored at card issuer 16. Card issuer 16 may then convert one or more notes of the selected audio signal into a low frequency electrical signal for use as a specific signal associated with chip-enabled card 18. Signal selection unit 52 may receive the specific signal from card issuer 16 via communication units 34 and store the specific signal associated with chip-enabled card 18 in signal database 54. In some examples, wearable device unit 44 may also send the specific signal associated with chip-enabled card 18 to wearable device 14 and/or chip-enabled card 18.

In the example illustrated in FIG. 2, computing device 12 includes virtual wallet unit 46 that stores one or more user selectable virtual assets for the performance of online transactions via a website, a POS device, or another external device. Virtual wallet unit 46 may include a plurality of virtual financial assets having individual assigned values and/or a plurality of virtual non-financial assets used to perform the online transactions. Each of the virtual financial assets included in virtual wallet unit 46 may correspond to a financial asset held by a financial institution, and each of the virtual non-financial assets included in virtual wallet unit 46 may correspond to a document, e.g., an identification card, held by a user. In some examples, virtual wallet unit 46 may include chip-enabled card 18 as a selectable option for the performance of a transaction. In response to the selection of chip-enabled card 18 by the user, wearable device unit 44 may instruct wearable device 14 to activate its transmitter in order to provide power to chip-enabled card 18.

In accordance with the techniques of this disclosure, computing device 12 may receive notifications regarding the operation of chip-enabled card 18 via communication units 34, and output the notifications to the user via UI devices 32. For example, in the case where wearable device 14 is unable to process a notification from chip-enabled card 18, computing device 12 paired with wearable device 14 may instead receive the notification indicating whether the specific signal has been verified to power chip-enabled card 18. The notification may comprise a sound, vibration, graphic, or text notification. In the case where the specific signal is not verified, computing device 12 may receive an alert through registered email, text, or an application "push" notification indicating next steps to retry verification of the specific signal. For example, as a security measure, chip-enabled card 18 may become locked and unusable after receipt of an unverifiable signal until the next steps, e.g., answering a security question or inputting a code, are performed by the user.

In another example, computing device 12 may receive a notification from card issuer 16 indicating whether a transaction performed by the powered chip-enabled card 18 is authenticated. For example, in the case where the transaction is declined, computing device 12 may receive an alert through registered email, text, or an application "push" notification that the attempted transaction was unsuccessful. If the user did not perform the attempted transaction, computing device 12 may communicate with card issuer 16 to put chip-enabled card 18 on hold.

Figure 3:
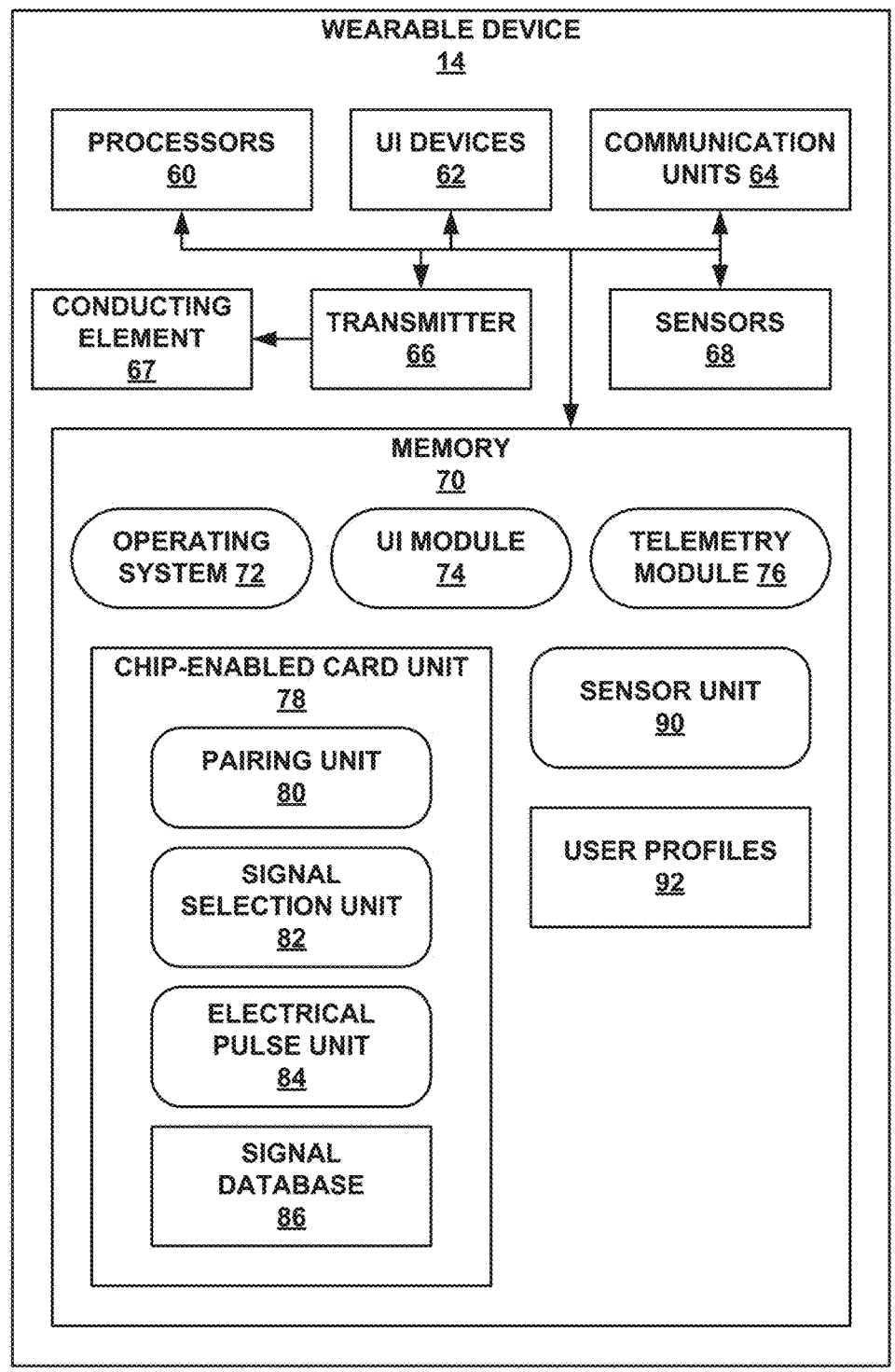
FIG. 3 is a block diagram illustrating an example wearable device configured to power a chip-enabled card, in accordance with the techniques of this disclosure.

FIG. 3 is a block diagram illustrating an example of wearable device 14 configured to power chip-enabled card 18, in accordance with the techniques of this disclosure. The architecture of wearable device 14 illustrated in FIG. 3 is shown for exemplary purposes only and wearable device 14 should not be limited to this architecture. In other examples, wearable device 14 may be configured in a variety of ways.

As shown in the example of FIG. 3, wearable device 14 includes one or more processors 70, one or more UI devices 62, one or more communication units 64, a transmitter 66 connected to a conducting element 67, one or more sensors 68, and one or more memory units 70. Memory 70 of wearable device 14 includes operating system 72, UI module 74, telemetry module 76, chip-enabled card unit 78, sensor unit 90 and user profiles 92, which are executable by processors 60. Each of the components, units or modules of wearable device 14 are coupled (physically, communicatively, and/or operatively) using communication channels for inter-component communications. In some examples, the communication channels may include a system bus, a network connection, an inter-process communication data structure, or any other method for communicating data.

Processors 60, in one example, may comprise one or more processors that are configured to implement functionality and/or process instructions for execution within wearable device 14. For example, processors 30 may be capable of processing instructions stored by memory 70. Processors 60 may include, for example, microprocessors, DSPs, ASICs, FPGAs, or equivalent discrete or integrated logic circuitry, or a combination of any of the foregoing devices or circuitry.

Memory 70 may be configured to store information within wearable device 14 during operation. Memory 70 may include a computer-readable storage medium or computer-readable storage device. In some examples, memory 70 includes one or more of a short-term memory or a long-term memory. Memory 70 may include, for example, RAM, DRAM, SRAM, magnetic discs, optical discs, flash memories, or forms of EPROM or EEPROM. In some examples, memory 70 is used to store program instructions for execution by processors 60. Memory 70 may be used by software or applications running on wearable device 14 (e.g., chip-enabled card unit 78 or sensor unit 90) to temporarily store information during program execution.

Wearable device 14 may utilize communication units 64 to communicate with external devices via one or more networks, e.g., network 10 from FIG. 1. Communication units 64 may be network interfaces, such as Ethernet interfaces, optical transceivers, RF transceivers, or any other type of devices that can send and receive information. Other examples of such network interfaces may include Wi-Fi, NFC, or Bluetooth radios. In some examples, wearable device 14 utilizes communication units 64 to wirelessly communicate with an external device such as card issuer 16 or computing device 12. Communication units 64 may be controlled by telemetry module 76.

UI devices 62 may be configured to operate as both input devices and output devices. For example, UI devices 62 may be configured to receive tactile, audio, or visual input from a user of wearable device 14. In addition to receiving input from a user, UI devices 62 may be configured to provide output to a user using tactile, audio, or video stimuli. In one example, UI devices 62 may be configured to output content such as a GUI for display at a display device. UI devices 62 may include a presence-sensitive display that displays a GUI and receives input from a user using capacitive, inductive, and/or optical detection at or near the presence sensitive display.

Other examples of UI devices 62 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 62 include a speaker, a CRT monitor, a LCD, OLED, or any other type of device that can generate intelligible output to a user.

Operating system 72 controls the operation of components of wearable device 14. For example, operating system 72, in one example, facilitates the communication of UI module 74, telemetry module 76, chip-enabled card unit 78, sensor unit 90, and user profiles 92 with processors 60, UI devices 62, communication units 64, transmitter 66, sensors 66, and memory 70. UI module 74, telemetry module 76, chip-enabled card unit 78, sensor unit 90, and user profiles 92 may each include program instructions and/or data stored in memory 70 that are executable by processors 60. As one example, chip-enabled card unit 78 may include instructions that cause wearable device 14 to perform one or more of the techniques described in this disclosure.

Wearable device 14 may include additional components that, for clarity, are not shown in FIG. 3. For example, wearable device 14 may include a battery to provide power to the components of wearable device 14. Similarly, the components of wearable device 14 shown in FIG. 3 may not be necessary in every example of wearable device 14.

In one example, wearable device 14 may be in the form of an electronic bracelet or a digital tattoo configured to monitor a user's vital signs and/or behavior biometrics via sensors 68. In some examples, sensors 68 may comprise conducting elements, e.g., similar to conducting element 67, that are in contact with a portion of the user's body to monitor the user's vital signs, such as heart rate, breathing rate, blood pressure, or body temperature. In other examples, sensors 68 may comprise pedometers, accelerometers, microphones, cameras, or the like, to monitor the user's behavior biometrics, e.g., gait, voice, or speed of typing, talking or texting.

Sensor unit 90 may receive the monitored vital signs and/or behavioral biometrics from sensors 68, and store the monitored information of the user in user profiles 92. User profiles 92 may include multiple profiles for the same user to track multiple different vitals or biometrics. In other examples, user profile 92 may include a profile tracking at least one vital or biometric for each of a plurality of users. In some examples, user profiles 92 may comprise historic profiles that track the users' vitals or biometrics over time. In other examples, user profiles 92 may comprise real-time profiles that store a discrete set of the user's vitals or biometrics at a given point in time. In some cases, sensor unit 90 may perform some analysis based on the monitored information, and output the results to the user via UI devices 62. In other cases, sensor unit 90 may transmit the monitored information or the analyzed information to an external device, e.g., computing device 12, via communication units 64 for further processing and/or output to the user.

In the example illustrated in FIG. 3, chip-enabled card unit 78 includes a pairing unit 80, a signal selection unit 82, an electrical pulse unit 84, and a signal database 86. According to the techniques of this disclosure, chip-enabled card unit 78 of wearable device 14 is configured to provide power to a paired chip-enabled card, e.g., chip-enabled card 18 from FIG. 1. In addition, in the case where wearable device 14 is a "smart" device, wearable device 14 may manage activation of chip-enabled card 18 issued to the user of wearable device 14. Wearable device 14, as illustrated in FIG. 3, comprises a "smart" device having full communication and/or processing capabilities.

To perform the initial activation of chip-enabled card 18, wearable device 14 may directly access card issuer 16 via a browser or other application executed by processors 60, or wearable device 14 may access card issuer 16 via an external device, e.g., computing device 12. Wearable device 14 may provide login information for the user to card issuer 16 in order to authenticate the user. Wearable device 14 may also register wearable device 14 with card issuer 16. Pairing unit 80 of chip-enabled card unit 78 may then establish a pairing between wearable device 14 and chip-enabled card 18. For example, pairing unit 80 may initiate communicate with chip-enabled card 18 using a short-range wireless communication protocol when chip-enabled card 18 is within a certain distance, e.g., less than 20 cm in the case of NFC. In other examples, instead of using a short-range wireless communication protocol, pairing unit 80 may pair wearable device 14 to chip-enabled card 18 using an online dashboard or interface via a browser or other application executed by processors 60. In addition, in some examples, pairing unit 80 may also be configured to establish a pairing between wearable device 14 and computing device 12.

As part of the initial activation of chip-enabled card 18, signal selection unit 82 of chip-enabled card unit 78 may select an audio signal to be associated with chip-enabled card 18. The selected audio signal may be a song or other audio recording that is uploaded to card issuer 16 by wearable device 14 via communication units 64, or selected by a user via UI devices 62 from a plurality of audio signals stored at card issuer 16. Card issuer 16 may convert one or more notes of the selected audio signal into a low frequency inaudible signal for use as a specific signal associated with chip-enabled card 18. In one example, card issuer 16 may create a loop using the one or more notes of the selected audio signal, and send the loop to an amplification driver that converts the looped notes into the low frequency inaudible signal. In other examples, card issuer 16 may randomly assign a low frequency inaudible signal as the specific signal for chip-enabled card 18.

Signal selection unit 82 may receive the specific signal from card issuer 16 via communication units 64 and store the specific signal associated with chip-enabled card 18 in signal database 86. In another example, signal selection unit 82 may store the specific signal in an external database that is accessible by wearable device 14. In some examples, chip-enabled card unit 78 may also send the specific signal to chip-enabled card 18. Wearable device 14 may be paired to a plurality of chip-enabled cards each having their own unique specific signals such that signal database 86 may include a plurality of specific signals for the respective plurality of chip-enabled cards. In another scenario, wearable device 14 may be paired to a plurality of chip-enabled cards issued for a same user account that all have the same specific signal such that signal database 86 may include a single specific signal for the plurality of chip-enabled cards.

When chip-enabled card 18 is proximate to wearable device 14, electrical pulse unit 84 of chip-enabled card unit 78 activates transmitter 66 in order to provide power to chip-enabled card 18. Electrical pulse unit 84 may also retrieve the specific signal associated with chip-enabled card 18 from either signal database 86 or an external database accessible by wearable device 14, e.g., signal database 54 within memory 36 of computing device 12. In some examples, wearable device 14 detects the proximity of chip-enabled card 18 based on whether communication units 34 are able to establish a short-range wireless communication with chip-enabled card 18. In other examples, instead of using a short-range wireless communication protocol to detect proximity, electrical pulse unit 84 may activate transmitter 66 based on a manual indication from the user, e.g., a touch input received from the user via UI devices 62 or an indication received from a virtual wallet executed on computing device 12.

Electrical pulse unit 84 then instructs transmitter 66 to transmit the specific signal associated with chip-enabled card 18 through conducting element 67 to the user's body. As described above, the specific signal associated with chip-enabled card 18 may be stored as a low frequency inaudible signal. When the low frequency inaudible signal comes in contact with the user's body via conducting element 67, a low frequency electromagnetic pulse is created that travels along or through the user's body. Transmitter 66 may be configured to transmit the specific signal at a relatively low power level in order to avoid making the user feel uncomfortable as the electromagnetic pulse travels along the user's body. In some cases, transmitter 66 may be adjusted by the user and/or manufacturer to attempt to achieve a balance between a power level needed for operation of chip-enabled card 18 and a power level that is not noticeable, or at least tolerable, by the user.

In some examples, wearable device 14 may use the monitored vital signs and/or behavioral biometrics stored in user profiles 92 to perform another level of authentication prior to powering chip-enabled card 18. For example, electrical pulse unit 84 may only instruct transmitter 66 to transmit the specific signal when the monitored information of the current user of wearable device 14 substantially matches one or more of user profiles 92. In the case where user profiles 92 comprise real-time profiles, sensor unit 90 may compare a current set of vital signs received via sensors 68 against a previous discrete set of vital signs included in user profiles 92. In the case where user profiles 92 comprise historic profiles, sensor unit 90 may compare the current set of vital signals received via sensors 68 against a historic profile of vital signs included in user profiles 92.

If sensor unit 90 detects a change in the user's vital signs over a certain limit or threshold, the change may indicate that the user is in distress (e.g., being coerced or otherwise forced into performing a transaction). In addition, if sensor unit 90 detects a sudden absence of vitals and biometrics followed by a different set of vitals and biometrics, the change may indicate that the current user of wearable device 14 is an unauthorized user. In either case, when the current user's vital signs do not match an expected pattern in user profiles 92, the user is not authenticated and electrical pulse unit 84 does not instruct transmitter 66 to transmit the specific signal to power chip-enabled card 18 to make transactions. When the user is not authenticated, wearable device 14 may receive a registered email, text, or an application "push" notification indicating next steps for the user to perform, e.g., answering a security question or inputting a code, to re-authenticate and retry transmission of the specific signal. In other examples, the vital sign and biometrics based authentication may be performed for wearable device 14 by computing device 12 based on user profiles 56.

In accordance with the techniques of this disclosure, wearable device 14 may receive notifications regarding the operation of chip-enabled card 18 via communication units 64, and output the notifications to the user via UI devices 62.

For example, wearable device 14 may receive a notification indicating whether the specific signal has been verified to power chip-enabled card 18. The notification may comprise a sound, vibration, graphic, e.g., a flashing red 'X', or text notification depending on the capabilities of wearable device 14. In the case where the specific signal is not verified, wearable device 14 may receive an alert through registered email, text, or an application "push" notification indicating next steps to re-transmit the specific signal. For example, as a security measure, chip-enabled card 18 may become locked and unusable after receipt of an unverifiable signal until the next steps, e.g., answering a security question or inputting a code, are performed by the user.

In another example, wearable device 14 may receive a notification from card issuer 16 indicating whether a transaction performed by the powered chip-enabled card 18 is authenticated. For example, in the case where the transaction is declined, wearable device 14 may receive an alert through registered email, text, or an application "push" notification that the attempted transaction was unsuccessful. If the user did not perform the attempted transaction, wearable device 14 may communicate with card issuer 16 to put chip-enabled card 18 on hold. In some examples, wearable device 14 may receive the notifications from card issuer 16 via computing device 12.

Chip-enabled card unit 78 of wearable device 14 may use the specific signal associated with chip-enabled card 18 to do more than power chip-enabled card 18. For example, upon receiving a notification that chip-enabled card 18 is powered by the specific signal, transmitter 66 of wearable device 14 may transmit a software update for chip-enabled card 18 through conducting element 67 and the user's body using the specific signal. For example, transmitter 66 may include a modulator configured to modulate the specific signal in order to communicate the software update to chip-enabled card 18.

Figure 4:
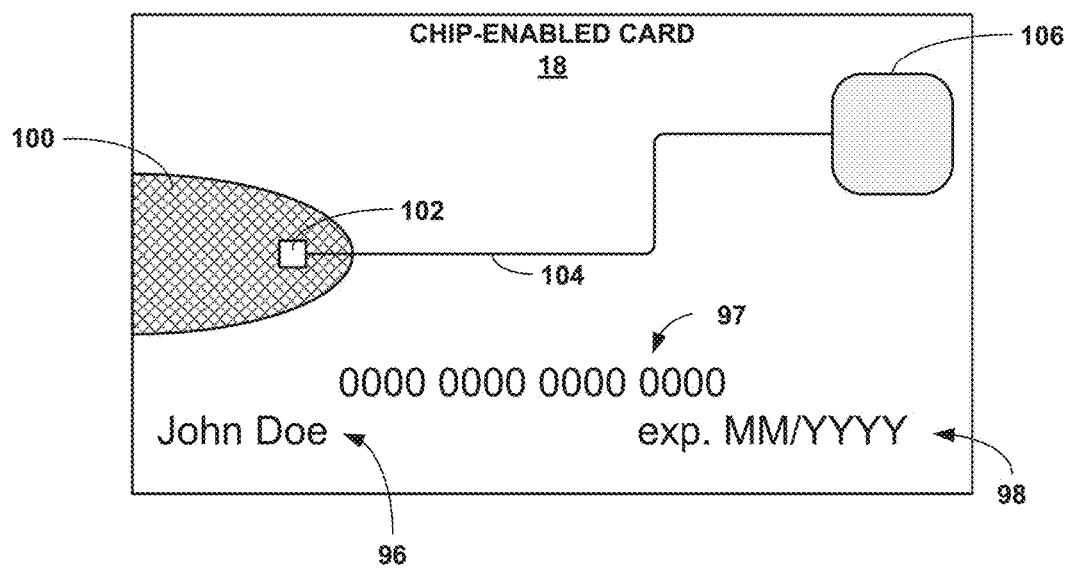
FIG. 4 is a conceptual diagram illustrating an example chip-enabled card including a touch pad configured to receive signals from a user's body, in accordance with the techniques of this disclosure.

FIG. 4 is a conceptual diagram illustrating an example of chip-enabled card 18 including a touch pad 100 configured to receive signals from a user's body, in accordance with the techniques of this disclosure. In the example of FIG. 4, chip-enabled card 18 comprises a chip-enabled credit card. In other examples, chip-enabled card 18 may comprise another type of financial instrument, such as a debit card, a gift card, or the like. In still other examples, chip-enabled card 18 may comprise a type of identification card, such a driver's license, a secure access badge, and insurance card, or the like.

In the illustrated example of FIG. 4, chip-enabled card 18 includes a user's name 96, the account number 97, and an expiration date 98 printed or embossed on the physical card. In addition, although not shown in FIG. 4, chip-enabled card 18 may include a card security code (CSC) (alternatively referred to as a card verification value (CVV) or card verification code (CVC)) printed or embossed on a back of the physical card. In some cases, chip-enabled card 18 may also include a magnetic stripe and a region for a user's signature attached on the back of the physical card.

In accordance with the techniques of this disclosure, chip-enabled card 18 also includes an electrically conducting touch pad 100 with a receiver 102. In some examples, receiver 102 may comprise a micro-receiver. Receiver 102 is configured to receive a specific signal as a low frequency electromagnetic pulse through a portion of the user's body that is in contact with touch pad 100. For example, when the low frequency electromagnetic pulse comes in contact with electrically conducting touch pad 100, the electromagnetic pulse creates a vibration that can be received by receiver 102 as the specific signal. As illustrated in FIG. 4, touch pad 100 may be shaped and positioned on chip-enabled card 18 to comfortably receive the portion of the user's body, e.g., the user's thumb, when the user is holding chip-enabled card 18. In some examples, touch pad 100 may operate as a biometric reader, e.g., a fingerprint reader, configured to collect biometric data from the portion of the user's body that is in contact with touch pad 100.

Chip-enabled card 18 also includes an IC chip 106 and a physical connector 104 between receiver 102 and IC chip 106. Physical connector 104 may comprise an electrically conducting material, e.g., copper, embedded in chip-enabled card 18 to enable signals to be exchanged between receiver 102 and IC chip 106. For example, upon receipt of the specific signal, receiver 102 may send the specific signal on physical connector 104 to IC chip 106 for verification. An example of IC chip 106 is described in more detail with respect to FIG. 5.

Figure 5:
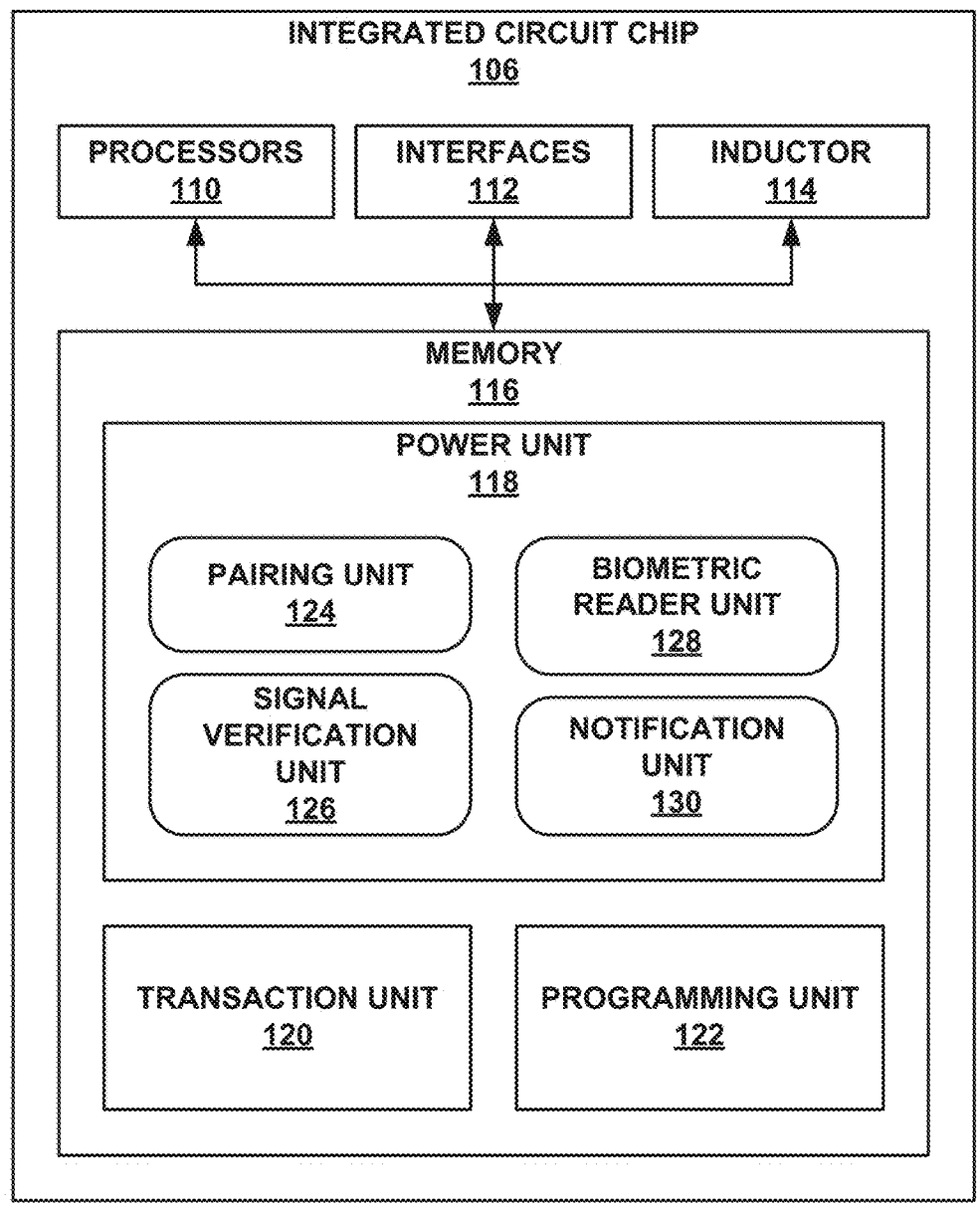
FIG. 5 is a block diagram illustrating an example integrated circuit (IC) chip on a chip-enabled card configured to verify a signal used to power the chip-enabled card, in accordance with the techniques of this disclosure.

FIG. 5 is a block diagram illustrating an example of IC chip 106 on chip-enabled card 18 configured to verify a signal used to power chip-enabled card 18, in accordance with the techniques of this disclosure. The architecture of IC chip 106 illustrated in FIG. 5 is shown for exemplary purposes only and IC chip 106 should not be limited to this architecture. In some examples, IC chip 106 may include additional components that, for clarity, are not shown in FIG. 5. In other examples, IC chip 106 may be configured in a variety of ways.

As shown in the example of FIG. 5, IC chip 106 may include one or more processors 110, one or more interfaces 112, at least one inductor 114, and one or more memory units 116. IC chip 106 also includes power unit 118, transaction unit 120, and programming unit 122, each of which may be implemented as program instructions and/or data stored in memory 116 and executable by processors 110 or implemented as one or more hardware units or devices of IC chip 106. In some examples, memory 116 of IC chip 106 may also store an operating system executable by processors 110. The operating system stored in memory 116 may control the operation of components of IC chip 106. The components, units or modules of IC chip 106 are coupled (physically, communicatively, and/or operatively) using communication channels for inter-component communications. In some examples, the communication channels may include a system bus, an inter-process communication data structure, or any other method for communicating data.

Processors 110, in one example, may comprise one or more processors that are configured to implement functionality and/or process instructions for execution within IC chip 106. For example, processors 110 may be capable of processing instructions stored by memory 116. Processors 110 may include, for example, microprocessors, DSPs, ASICs, FPGAs, or equivalent discrete or integrated logic circuitry, or a combination of any of the foregoing devices or circuitry.

Memory 116 may be configured to store information within IC chip 106 during operation. Memory 116 may include a computer-readable storage medium. In some examples, memory 116 includes one or more of a short-term memory or a long-term memory. Memory 116 may include, for example, RAM, DRAM, SRAM, flash memories, or forms of EPROM or EEPROM. In some examples, memory 116 is used to store program instructions for execution by processors 110. Memory 116 may be used by software running on IC chip 106 (e.g., power unit 118, transaction unit 120, or programming unit 122) to temporarily store information during program execution.

IC chip 106 may utilize interfaces 112 to communicate with external devices, e.g., wearable device 14 and external device 20 from FIG. 1. Interfaces 112 may be network interfaces, such as Ethernet interfaces, optical transceivers, RF transceivers, or any other type of devices that can send and receive information. Other examples of such network interfaces may include Wi-Fi, NFC, or Bluetooth radios. IC chip 106 does not include an internal power source and, instead, may utilize inductor 114 to capture a signal from an external device, rectify the captured signal, and use the rectified signal to power IC chip 106.

In the example illustrated in FIG. 5, power unit 118 of IC chip 106 includes a pairing unit 124, a signal verification unit 126, a biometric reader unit 128, and a notification unit 130. According to the techniques of this disclosure, IC chip 106 is configured to receive power from a paired wearable device, e.g., wearable device 14 from FIG. 1, instead of from any external device emitting an electromagnetic pulse.

Pairing unit 124 of power unit 118 may establish a pairing between chip-enabled card 18 and wearable device 14 during initial activation of chip-enabled card 18. For example, pairing unit 124 may communicate with wearable device 14 using a short-range wireless communication protocol via interfaces 112. In addition, during initial activation, IC chip 106 may receive a specific signal associated with chip-enabled card 18. IC chip 106 may store the specific signal in memory 116. In some cases, IC chip 106 may only store one unique specific signal for chip-enabled card 18. In other cases, IC chip 106 may store multiple specific signals for chip-enabled card 18 with each of the specific signals associated with a different paired wearable device.

In some examples, when chip-enabled card 18 is proximate to paired wearable device 14, power unit 118 of IC chip 106 activates receiver 102 in order to receive a signal from wearable device 14 through the portion of the user's body in contact with touch pad 100. IC chip 106 may detect the proximity of paired wearable device 14 based on establishing a short-range wireless communication with wearable device 14. In other examples, receiver 102 may always be active or may be activated based on touch pad 100 detecting contact with the portion of the user's body.

Upon receiving a signal from receiver 102, signal verification unit 126 of power unit 118 verifies whether the received signal is the specific signal associated with chip-enabled card 18. For example, signal verification unit 126 may compare the received signal against one or more associated specific signals stored in memory 116. If the received signal matches one of the associated specific signals, signal verification unit 126 verifies the received signal to power IC chip 106. In the case where memory 116 only stores one unique specific signal for chip-enabled card 18, signal verification unit 126 compares the received signal against the one unique specific signal associated with chip-enabled card 18. In the case where memory 116 stores multiple specific signals for chip-enabled card 18, signal verification unit 126 compares the received signal against each of the multiple specific signals associated with the chip-enabled card 18.

Once the received signal is verified as the specific signal associated with the chip-enabled card 18, power unit 118 may instruct inductor 114 to capture the specific signal from receiver 102, rectify the captured signal, and use the rectified signal to power IC chip 106 to perform transactions. In some examples, a short-range wireless communication signal and/or the unverified signal received from wearable device 14 may provide power for limited operations of IC chip 106, e.g., operations performed by power unit 118, but only the verified specific signal may be used to power transaction unit 120 or programming unit 122. In the case where the received signal is not verified, signal verification unit 126 may lock or otherwise stop itself from retrying to verify the same signal or any other signal until the user takes additional steps to reauthenticate.

As described above with respect to FIG. 4, touch pad 100 may comprises a biometric reader configured to collect biometric data, e.g., fingerprint data, from the portion of the user's body that is in contact with touch pad. In this case, biometric reader unit 128 of power unit 118 may use the biometric data to perform another level of authentication prior to verifying the specific signal. For example, biometric reader unit 128 may compare the received biometric data against a user profile or database (not shown) of biometric data for the user, and authenticate the current user when the biometric data matches the user profile. In some examples, the biometric user profile or database may be stored in memory 118 of IC chip 106 or may be stored in an external device that is accessible by IC chip 106. If the received biometric data does not match the biometric data for the authorized user, biometric reader unit 128 may lock or otherwise stop signal verification unit 126 from verifying the received signal.

Notification unit 130 is configured to generate and transmit notifications to paired wearable device 14 indicating whether card 18 is powered by the specific signal received from wearable device 14. For example, in the case where signal verification unit 126 is unable to verify the received signal, notification unit 130 may send a notification to wearable device 14 indicating that the verification failed and chip-enabled card 18 is not powered. The notification may take different forms depending on the capabilities of wearable device 14. For example, the notification may include next steps to be performed by a user, e.g., answering a security question or inputting a code, in order to unlock signal verification unit 126 and retry signal verification.

When IC chip 106 is powered by the specific signal, transaction unit 120 emits a signal that includes the user's information to perform a transaction via interfaces 112 with an external device, e.g., external device 20 from FIG. 1. Transaction unit 120 may be configured to emit the transaction signal while the portion of the user's body is in contact with touch pad 100 of chip-enabled card 18 and the specific signal associated with chip-enabled card 18 is being received. In this way, transaction unit 120 may only perform a transaction while the user is holding chip-enabled card 18 at touch pad 100. In another example, transaction unit 120 may be configured to emit the transaction signal for a time period after the specific signal associated with chip-enabled card 18 is received but while the portion of the user's body is no longer in contact with touch pad 100. In this example, the user may power chip-enabled card 18 by briefly holding and then releasing the chip-enabled card 18 at touch pad 100. Transaction unit 120 may then perform a transaction within the time period, e.g., 30 seconds, after the user released touch pad 100.

In some examples, the specific signal associated with chip-enabled card 18 may be used to do more than power IC chip 106. For example, programming unit 122 may be configured to receive a modulated version of the specific signal carrying a software update for IC chip 106. Programming unit 122 may update the software, e.g., power unit 118 or transaction unit 120, executing on IC chip 106 according to the software update.

Figure 6:
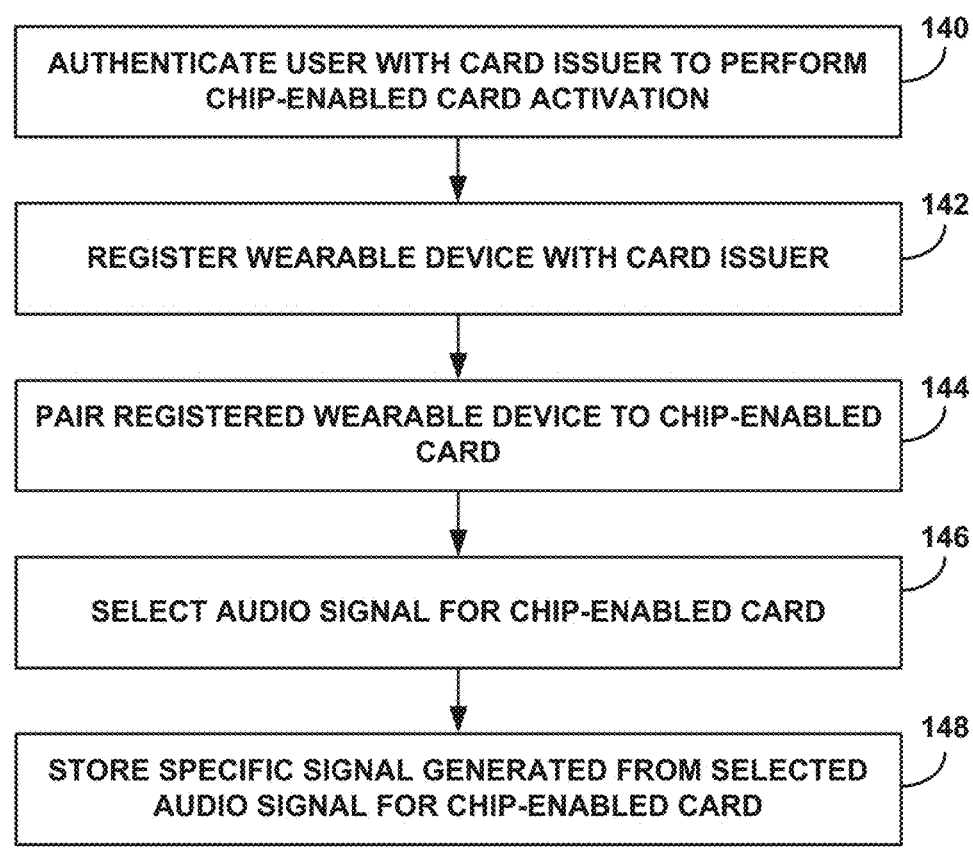
FIG. 6 is a flowchart illustrating an example operation of initially activating a chip-enabled card, in accordance with the techniques of this disclosure.

FIG. 6 is a flowchart illustrating an example operation of initially activating a chip-enabled card, in accordance with the techniques of this disclosure. Upon receipt of chip-enabled card 18, a user may need to initial activate the card with card issuer 16. This may be done to ensure that chip-enabled card 18 was received by the appropriate user. In some examples, the user may activate chip-enabled card 18 with card issuer 16 via network 10. For example, wearable device 14 and/or computing device 12 may access a website of card issuer 16 using a browser or a card issuer application executing on the respective device.

As discussed above, in one case, wearable device 14 is configured as a "smart" device that is capable of accessing the Internet and/or running applications. In this case, wearable device 14 may be configured to perform the initial activation of chip-enabled card 18. In another case, wearable device 14 may be configured to operate as an accessory to computing device 12 that does not have full communication capabilities. In this case, computing device 12 may be configured to perform the initial activation of chip-enabled card 18. The example operation of FIG. 6 is described herein as being performed by wearable device 14.

Wearable device 14 accesses card issuer 16 via network 10 to activate chip-enabled card 18. Wearable device 14 provides login information, e.g., user ID and password or access code, to authenticate the user of wearable device 14 with card issuer 16 (140). Once the user is authenticated, wearable device 14 registers itself with card issuer 16 (142). Wearable device 14 may be registered by providing a device ID or other information to card issuer 16. As part of the registration process, card issuer 16 may attempt a test communication with wearable device 14 to verify that wearable device 14 is a real device, and/or may verify that wearable device 14 is associated with the authenticated user's email address or phone number, for example.

Once wearable device 14 is registered, wearable device 14 pairs itself to chip-enabled card 18 (144). As part of the pairing process, wearable device 14 may initiate communication with chip-enabled card 18 via a short-range wireless communication protocol, such as NFC or Bluetooth. Wearable device 14 and chip-enabled card 18 may exchange some information to establish the pairing, such as identification information and/or communication capabilities. Wearable device 14 and chip-enabled card 18 may also periodically send "keepalive" messages to maintain the pairing. In addition, card issuer 16 may record the pairing between registered wearable device 14 and chip-enabled card 18.

Wearable device 14 then selects an audio signal for chip-enabled card 18 (146). In some examples, the selected audio signal may be a song or other audio recording that is uploaded to card issuer 16 via wearable device 14. In other examples, the selected audio signal may be selected from a plurality of audio signals stored at card issuer 16. Card issuer 16 may then convert one or more notes of the selected audio signal into a low frequency electrical signal for use as a specific signal associated with chip-enabled card 18.

Wearable device 14 may receive the specific signal generated based on the selected audio signal from card issuer 16, and store the specific signal associated with chip-enabled card 18 (148). In one example, wearable device 14 may store the specific signal associated with chip-enabled card 18 in a memory, e.g., memory 70, included in wearable device 14. In another example, wearable device 14 may store the specific signal in an external database accessible by wearable device 14, e.g., signal database 54 within memory 36 of computing device 12. In addition, chip-enabled card 18 may receive the specific signal associated with chip-enabled card 18 either from wearable device 14 or directly from card issuer 16. Chip-enabled card 18 may store the specific signal associated with chip-enabled card 18 in a memory, e.g., memory 116, of IC chip 106 on chip-enabled card 18.

Figure 7:
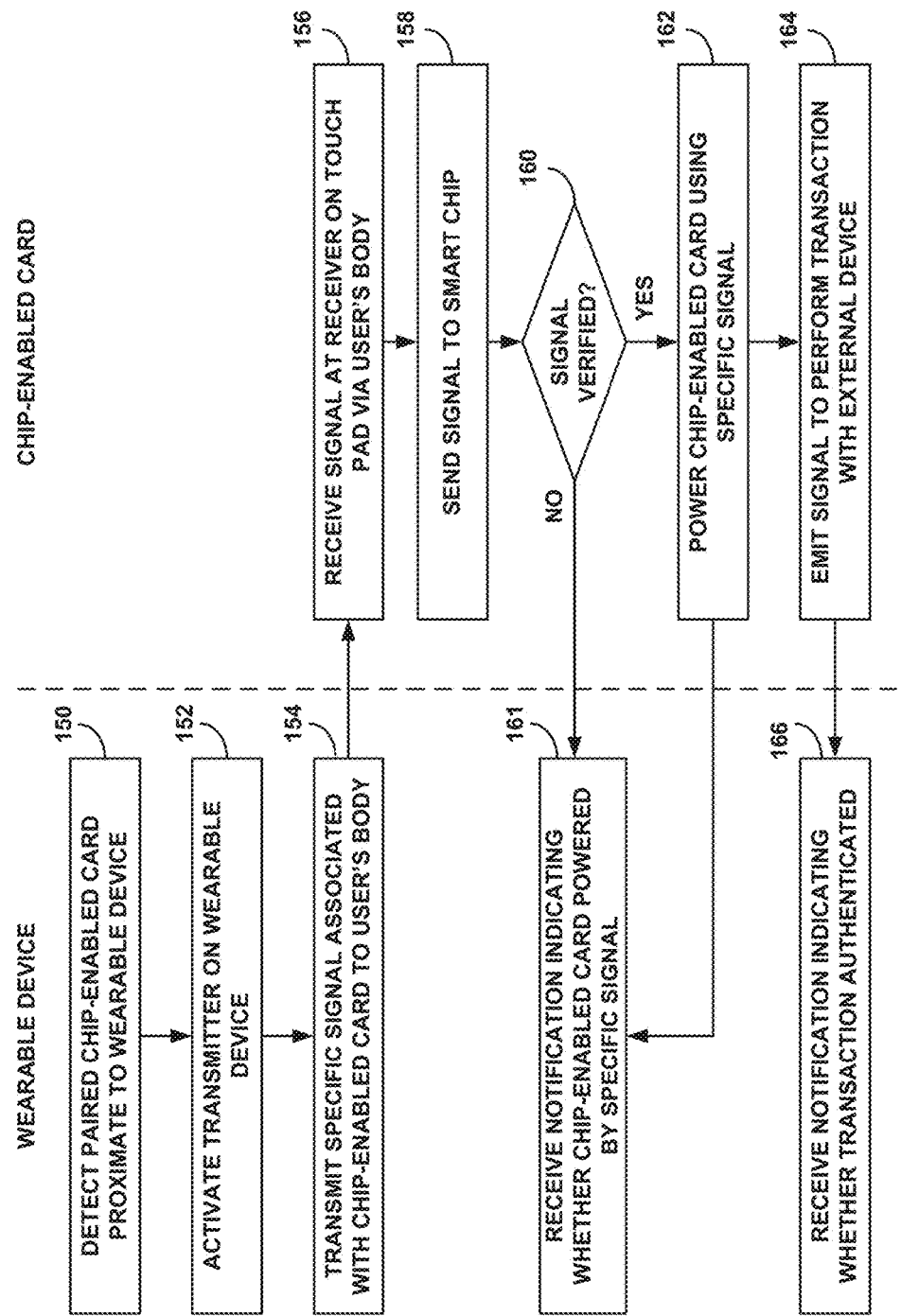
FIG. 7 is a flowchart illustrating an example operation of a wearable device providing power to a chip-enabled card to perform transactions, in accordance with techniques of this disclosure.

FIG. 7 is a flowchart illustrating an example operation of a wearable device providing power to a chip-enabled card to perform transactions, in accordance with techniques of this disclosure. The example operation of FIG. 7 is described with respect to wearable device 14 and chip-enabled card 18.

Wearable device 14 first detects that paired chip-enabled card 18 is proximate to wearable device 14 (150). For example, wearable device 14 may establish communication with chip-enabled card 18 within a certain distance using a short-range wireless communication protocol, such as NFC or Bluetooth. In some scenarios, wearable device 14 may continuously send out short-range wireless communication protocol signals in order to detect any chip-enabled cards within the certain distance, e.g., 20 cm or less in the case of NFC, from wearable device 14. Once communication is established, wearable device 14 may determine whether a proximate chip-enabled card is paired to wearable device 14.

Based on paired chip-enabled card 18 being proximate to wearable device 14, wearable device 14 activates transmitter 66 of wearable device 14 (152). In addition, wearable device 14 retrieves the specific signal associated with chip-enabled card 18. In one example, wearable device 14 may retrieve the specific signal associated with chip-enabled card 18 from signal database 86 within memory 70 of wearable device 14. In another example, wearable device 14 may retrieve the specific signal from an external database accessible by wearable device 14, e.g., signal database 54 within memory 36 of computing device 12. Transmitter 66 of wearable device 14 then transmits the specific signal associated with chip-enabled card 18 through conducting element 67 to the user's body (154). For example, the specific signal may comprise a low frequency electromagnetic pulse that travels along the user's body.

In some examples, sensors 68 of wearable device 14 monitor one or more vital signs of the user, e.g., heart rate, breathing rate, blood pressure, body temperature, or one or more behavioral biometrics of the user, e.g., gait, voice, or speed of typing, talking or texting. When paired chip-enabled card 18 is proximate to wearable device 14, wearable device 14 may compare the monitored vital signs of the user against a user profile. In this example, transmitter 66 of wearable device 14 only transmits the specific signal associated with chip-enabled card 18 when the monitored vital signs substantially match the user profile. In one case, wearable device 14 might not track the user's vital signs over time, but instead performs a comparison of real-time vital signs. In this case, wearable device 14 compares a current set of vital signals received via sensors 68 against a previous discrete set of vital signs included in the user profile. In another case, wearable device 14 may compare the current set of vital signals received via sensors 68 against a historic profile of vital signs included in the user profile. In either case, wearable device 14 is looking for a change in vital signals that may indicate that the user is in distress and, therefore, not transmit the specific signal to power chip-enabled card 18 to make transactions.

Chip-enabled card 18 receives a signal with receiver 102 on touch pad 100 from paired wearable device 14 through a portion of a user's body in contact with touch pad 100 (156). The portion of the user's body may be a user's thumb that is placed on touch pad 100 when the user holds chip-enabled card 18. For example, touch pad 100 may comprise an electrically conducting area such that the low frequency electromagnetic pulse received through the user's thumb creates a vibration that can be received by receiver 102 as the signal.

In some examples, prior to receiving a signal, IC chip 106 of chip-enabled card 18 may establish communication with wearable device 14 when within a certain distance using a short-range wireless communication protocol, such as NFC or Bluetooth. Once communication is established, IC chip 106 may determine that proximate wearable device 14 is paired to chip-enabled card 18. In one example, based on paired wearable device 14 being proximate to chip-enabled card 18, IC chip 106 may activate receiver 102 of touch pad 100 on chip-enabled card 18 to receive a signal from paired wearable device 14. In other examples, receiver 102 may always be active or may be activated based on touch pad 100 detecting contact with the portion of the user's body, e.g., detecting pressure or the user's fingerprint.

Upon receiving a signal, receiver 102 on touch pad 100 sends the received signal to IC chip 106 of chip-enabled card 18 via physical connection 104 (158). IC chip 106 verifies whether the received signal is the specific signal associated with chip-enabled card 18 (160). In some examples, the specific signal may be unique to chip-enabled card 18 such that chip-enabled card 18 is only powered upon receipt of the one specific signal, regardless of the paired wearable computing device sending the specific signal. In other examples, the specific signal may be unique to a pairing between chip-enabled card 18 and wearable computing device 14 such that chip-enabled card 18 is powered by the specific signal when received from wearable computing device 14, but may be powered by other signals when received from other paired wearable computing devices. For example, IC chip 106 may compare the received signal against one or more associated specific signals stored in memory 116 of IC chip 106 on chip-enabled card 18.

In the case where the received signal is verified as the specific signal associated with chip-enabled card 18 (YES branch of 160), IC chip 106 is powered using the specific signal (162). For example, inductor 114 of IC chip 106 may capture the specific signal, rectify the captured signal, and use the rectified signal to power IC chip 106. In the case where the received signal is not verified as the specific signal associated with chip-enabled card 18 (NO branch of 160), IC chip 106 is not powered by the specific signal. In either case, IC chip 106 may send a notification to wearable device 14 indicating whether the chip-enabled card is powered by the specific signal.

Wearable device 14 receives the notification indicating whether chip-enabled card 18 is powered by the specific signal (161). The notification may comprise a first sound, vibration, or graphic indicating that the specific signal was verified by chip-enabled card 18. Conversely, the notification may comprise a second sound, vibration, or graphic indicating that the specific signal was not verified by chip-enabled card 18 such that chip-enabled card 18 is not powered to make transactions. In this case, wearable device 14 and/or computing device 12 may prompt the user to perform additional security steps, e.g., answer security questions or input a code, in order to re-transmit the specific signal to chip-enabled card 18.

In some examples, touch pad 100 comprises a biometric reader configured to collect biometric data from the portion of the user's body that is in contact with touch pad 100, e.g., collecting a fingerprint of the user's thumb in contact with touch pad 100. In these examples, IC chip 106 may authenticate the user based on the collected biometric data prior to verifying the specific signal. In the case where chip-enabled card 18 has been lost or stolen, the biometric-based authentication performed by IC chip 106 may avoid verifying the specific signal and powering chip-enabled card 18 for use by an unauthorized user.

Once IC chip 106 of chip-enabled card 18 is powered by the specific signal, IC chip 106 emits a signal to perform a transaction with external device 20 (164). The emitted signal may include the user's information needed to perform the transaction. In some examples, external device 20 may comprise a POS device at a merchant from which the user is purchasing a good or service. In other examples, external device 20 may comprise another computing device to which the user is transferring funds, providing identification information, requesting secure access, or the like.

In one example, IC chip 106 may emit the signal only while the portion of the user's body is in contact with touch pad 100 and the specific signal associated with chip-enabled card 18 is received by receiver 102. In this example, the user may only perform a transaction using chip-enabled card 18 while the user is holding chip-enabled card 18 at touch pad 100. In another example, IC chip 106 may emit the signal for a time period after the specific signal associated with chip-enabled card 18 is received by receiver 102 and the portion of the user's body is no longer in contact with touch pad 100. In this example, the user may power chip-enabled card 18 by briefly holding the chip-enabled card 18 at touch pad 100, and then may perform a transaction using chip-enabled card 18 within, e.g., 30 seconds of releasing touch pad 100.

When chip-enabled card 18 is powered and performing transactions with external device 20, wearable device 14 may receive a notification indicating whether the transaction performed by the powered chip-enabled card 18 is authenticated (166). In some examples, wearable device 14 may receive the transaction notification directly from card issuer 16, which is responsible for accepting or declining the transaction, or from card issuer 16 via computing device 12. In this way, the user may receive a notification on wearable device 14 of an attempted transaction with paired chip-enabled card 18 regardless of whether or not the transaction is successful. If the user did not perform the attempted transaction, the user may put chip-enabled card 18 on hold with card issuer 16 via wearable device 14 or computing device 12.

In addition, in some examples, once IC chip 106 on chip-enabled card 18 is powered by the specific signal, transmitter 66 of wearable device 14 may transmit a software update for chip-enabled card 18 through conducting element 67 and the user's body using the specific signal. For example, transmitter 66 may include a modulator configured to modulate the specific signal in order to communicate the software update to chip-enabled card 18. Receiver 102 of chip-enabled card 18 may receive the software update for chip-enabled card 18 using the specific signal through the portion of the user's body in contact with touch pad 100. Receiver 102 may send the software update to IC chip 106 via physical connection 104 on chip-enabled card 18. IC chip 106 may then update software executing on IC chip 106 according to the software update.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A wearable computing device comprising:
a transmitter connected to a conducting element of the wearable computing device in contact with a user's body; and
one or more processors connected to the transmitter and configured to:
instruct the transmitter to transmit a specific signal associated with a chip-enabled card through the conducting element that is in contact with the user's body, wherein the chip-enabled card is paired to the wearable computing device; and
receive a notification indicating whether the chip-enabled card is powered by the specific signal.

2. The wearable computing device of claim 1, wherein prior to instructing the transmitter to transmit the specific signal, the one or more processors are configured to detect that the chip-enabled card is proximate to the wearable computing device.

3. The wearable computing device of claim 2, wherein, to detect that the chip-enabled card is proximate to the wearable computing device, the one or more processors are configured to:
establish communication with the chip-enabled card within a certain distance using a short-range wireless communication protocol; and
based on the communication, determine that the wearable computing device is paired to the chip-enabled card.

4. The wearable computing device of claim 2, wherein the one or more processors are configured to, based on the chip-enabled card being proximate to the wearable computing device:
retrieve the specific signal associated with the chip-enabled card from one of a memory included in the wearable computing device or a database accessible by the wearable computing device; and
activate the transmitter included in the wearable computing device.

5. The wearable computing device of claim 2, further comprising one or more sensors configured to monitor vital signs of the user, wherein, the one or more processors are connected to the one or more sensors and configured to:
based on the chip-enabled card being proximate to the wearable computing device, compare the monitored vital signs of the user against a user profile;
based on the monitored vital signs substantially matching the user profile, retrieve the specific signal associated with the chip-enabled card from one of a memory included in the wearable computing device or a database accessible by the wearable computing device; and
activate the transmitter included in the wearable computing device.

6. The wearable computing device of claim 5, wherein, to compare the monitored vital signals against the user profile, the one or more processors are configured to one of:
compare a set of vital signals received from the one or more sensors against a previous discrete set of vital signs included in the user profile; or
compare the set of vital signals received from the one or more sensors against a historic profile of vital signs included in the user profile.

7. The wearable computing device of claim 1, wherein the one or more processors are configured to:
receive a selection of the chip-enabled card by the user to perform a transaction;
in response to the selection of the chip-enabled card, retrieve the specific signal associated with the chip-enabled card from one of a memory included in the wearable computing device or a database accessible by the wearable computing device; and
activate the transmitter included in the wearable computing device.

8. The wearable computing device of claim 1, wherein the one or more processors are further configured to instruct the transmitter to transmit a software update for the chip-enabled card through the conducting element that is in contact with the user's body using the specific signal.

9. The wearable computing device of claim 1, wherein the one or more processors are configured to, during initial activation of the chip-enabled card with a card issuer of the chip-enabled card:
authenticate the user of the wearable computing device with the issuer of the chip-enabled card;
register the wearable computing device with the card issuer; and
pair the registered wearable computing device to the chip-enabled card.

10. The wearable computing device of claim 1, wherein the one or more processors are configured to, during initial activation of the chip-enabled card with a card issuer of the chip-enabled card:
select an audio signal for the chip-enabled card;
receive, from the card issuer, the specific signal generated based on the selected audio signal; and
store the specific signal associated with the chip-enabled card in one of a memory included in the wearable computing device or a database accessible by the wearable computing device.

11. The wearable computing device of claim 1, wherein the one or more processors are configured to, based on the chip-enabled card being powered by the specific signal, receive another notification indicating whether a transaction performed by the powered chip-enabled card is authenticated.

12. A method comprising:
transmitting, by a wearable computing device including a conducting element in contact with a user's body, a specific signal associated with a chip-enabled card through the conducting element that is in contact with the user's body, wherein the chip-enabled card is paired to the wearable computing device; and
receiving, by the wearable computing device, a notification indicating whether the chip-enabled card is powered by the specific signal.

13. The method of claim 12, further comprising, prior to transmitting the specific signal, detecting, by the wearable computing device, that the chip-enabled card is proximate to the wearable computing device.

14. The method of claim 13, wherein detecting that the chip-enabled card is proximate to the wearable computing device comprises:
establishing communication with the chip-enabled card within a certain distance using a short-range wireless communication protocol; and based on the communication, determining that the wearable computing device is paired to the chip-enabled card.

15. The method of claim 13, further comprising, based on the chip-enabled card being proximate to the wearable computing device:
retrieving the specific signal associated with the chip-enabled card from one of a memory included in the wearable computing device or a database accessible by the wearable computing device; and
activating a transmitter included in the wearable computing device to transmit the specific signal.

16. The method of claim 13, further comprising:
monitoring, by one or more sensors included in the wearable computing device, vital signs of the user;
based on the chip-enabled card being proximate to the wearable computing device, comparing the monitored vital signs of the user against a user profile;
based on the monitored vital signs substantially matching the user profile, retrieving the specific signal associated with the chip-enabled card from one of a memory included in the wearable computing device or a database accessible by the wearable computing device; and
activating a transmitter included in the wearable computing device to transmit the specific signal.

17. The method of claim 16, wherein comparing the monitored vital signals against the user profile comprises one of:
comparing a set of vital signals received from the one or more sensors against a previous discrete set of vital signs included in the user profile; or
comparing the set of vital signals received from the one or more sensors against a historic profile of vital signs included in the user profile.

18. The method of claim 12, further comprising:
receiving a selection of the chip-enabled card by the user to perform a transaction;
in response to the selection of the chip-enabled card, retrieving the specific signal associated with the chip-enabled card from one of a memory included in the wearable computing device or a database accessible by the wearable computing device; and
activating a transmitter in the wearable computing device to transmit the specific signal.

19. The method of claim 12, further comprising transmitting a software update for the chip-enabled card through the conducting element that is in contact with the user's body using the specific signal.

20. The method of claim 12, further comprising, during initial activation of the chip-enabled card with a card issuer of the chip-enabled card:
authenticating the user of the wearable computing device with the issuer of the chip-enabled card;
registering the wearable computing device with the card issuer; and
pairing the registered wearable computing device to the chip-enabled card.

21. The method of claim 12, further comprising, during initial activation of the chip-enabled card with a card issuer of the chip-enabled card:
selecting an audio signal for the chip-enabled card;
receiving, from the card issuer, the specific signal generated based on the selected audio signal; and
storing the specific signal associated with the chip-enabled card in one of a memory included in the wearable computing device or a database accessible by the wearable computing device.

22. The method of claim 12, further comprising, based on the chip-enabled card being powered by the specific signal, receiving another notification indicating whether a transaction performed by the powered chip-enabled card is authenticated.

23. A chip-enabled card comprising:
a touch pad;
a receiver configured to receive a signal from a wearable computing device through the touch pad when a portion of a user's body is in contact with the touch pad, wherein the chip-enabled card is paired to the wearable computing device; and
an integrated circuit chip connected to the receiver and configured to:
determine whether the signal is a specific signal associated with the chip-enabled card; and
based on the received signal being the specific signal associated with the chip-enabled card, power the integrated circuit chip using the specific signal.

24. The chip-enabled card of claim 23, wherein based on the integrated circuit chip being powered, the integrated circuit chip is further configured to emit a signal to perform a transaction with an external device.

25. The chip-enabled card of claim 24, wherein, to emit the signal to perform the transaction, the integrated circuit chip is configured to at least one of:
emit the signal while the portion of the user's body is in contact with the touch pad and the specific signal associated with the chip-enabled card is received by the receiver; or
emit the signal for a time period after the specific signal associated with the chip-enabled card is received by the receiver and while the portion of the user's body is no longer in contact with the touch pad.

26. The chip-enabled card of claim 23, wherein the integrated circuit chip is configured to:
establish communication with the wearable computing device within a certain distance using a short-range wireless communication protocol;
based on the communication, determine that the wearable computing device is paired to the chip-enabled card; and
activate the receiver included in the touch pad of the chip-enabled card to receive the signal from the paired wearable computing device.

27. The chip-enabled card of claim 23, wherein, to determine whether the signal is the specific signal associated with the chip-enabled card, the integrated circuit chip is configured to compare the signal against one or more specific signals associated with the chip-enabled card, wherein the one or more specific signals are stored in a memory of the chip-enabled card.

28. The chip-enabled card of claim 23, wherein the integrated circuit chip is configured to send a notification to the wearable computing device indicating whether the chip-enabled card is powered by the specific signal.

29. The chip-enabled card of claim 23,
wherein the receiver is configured to receive a software update for the chip-enabled card using the specific signal through the touch pad when the portion of the user's body is in contact with the touch pad; and
wherein the integrated circuit chip is further configured to update software executing on the integrated circuit chip according to the software update.

30. The chip-enabled card of claim 23,
wherein the touch pad comprises a biometric reader configured to collect biometric data from the portion of the user's body that is in contact with the touch pad; and
wherein the integrated circuit chip is configured to authenticate the user based on the collected biometric data.

31. The chip-enabled card of claim 23, wherein the integrated circuit chip is configured to, during initial activation of the chip-enabled card with a card issuer of the chip-enabled card:
receive, from the card issuer, the specific signal associated with the chip-enabled card; and
store the specific signal associated with the chip-enabled card in a memory of the chip-enabled card.

32. A method comprising:
receiving, by a chip-enabled card including a touch pad, a signal from a wearable computing device through the touch pad when a portion of a user's body is in contact with the touch pad, wherein the chip-enabled card is paired to the wearable computing device;
determining, by the chip-enabled card, whether the signal is a specific signal associated with the chip-enabled card; and
based on the received signal being the specific signal associated with the chip-enabled card, powering an integrated circuit chip of the chip-enabled card using the specific signal.

33. The method of claim 32, further comprising emitting, based on the integrated circuit chip being powered, a signal to perform a transaction with an external device.

34. The method of claim 33, wherein emitting the signal to perform the transaction further comprises at least one of:
emitting the signal while the portion of the user's body is in contact with the touch pad and the specific signal associated with the chip-enabled card is received by the receiver; or
emitting the signal for a time period after the specific signal associated with the chip-enabled card is received by the receiver and while the portion of the user's body is no longer in contact with the touch pad.

35. The method of claim 32, further comprising:
establishing communication with the wearable computing device within a certain distance using a short-range wireless communication protocol;
based on the communication, determining that the wearable computing device is paired to the chip-enabled card; and
activating a receiver included in the touch pad of the chip-enabled card to receive the signal from the paired wearable computing device.

36. The method of claim 32, wherein determining whether the signal is the specific signal associated with the chip-enabled card further comprises comparing the signal against one or more specific signals associated with the chip-enabled card, wherein the one or more specific signals are stored in a memory of the chip-enabled card.

37. The method of claim 32, further comprising sending a notification to the wearable computing device indicating whether the chip-enabled card is powered by the specific signal.

38. The method of claim 32, further comprising:
receiving a software update for the chip-enabled card using the specific signal through the touch pad when the portion of the user's body is in contact with the touch pad; and
updating software executing on the integrated circuit chip according to the software update.

39. The method of claim 32, wherein the touch pad comprises a biometric reader, the method further comprising:
collecting, by the biometric reader, biometric data from the portion of the user's body that is in contact with the touch pad; and
authenticating the user based on the collected biometric data.

40. The method of claim 32, further comprising, during initial activation of the chip-enabled card with a card issuer of the chip-enabled card:
receiving, by the chip-enabled card and from the card issuer, the specific signal associated with the chip-enabled card; and
storing the specific signal associated with the chip-enabled card in a memory of the chip-enabled card.

* * * * *